United States Patent Office 3,269,964
Patented August 30, 1966

3,269,964
WATER DISPERSIBLE FORM OF DIALDEHYDE
POLYSACCHARIDES AND PROCESS THEREFOR
James Huey Curtis, Elkhart, Ind., assignor to Miles
Laboratories, Inc., Elkhart, Ind., a corporation of
Indiana
No Drawing. Filed Oct. 26, 1964, Ser. No. 406,220
10 Claims. (Cl. 260—17.3)

This is a continuation-in-part of my copending application Serial No. 329,954 filed on December 12, 1963, now abandoned.

This invention relates to a form of dialdehyde polysaccharides which is soluble in water at room temperature and to a process of preparing such material. More particularly, this invention relates to a spray dried composition of the reaction product between a dialdehyde polysaccharide and a condensation product of dicyandiamide and formaldehyde.

Dialdehyde polysaccharides are well known in the art. Such materials are frequently referred to as periodate oxidized polysaccharides because of their preparation by the well known oxidation of polysaccharides with periodic acid. This preparation can be illustrated by the conversion of a polysaccharide, such as starch, to dialdehyde starch or periodate oxidized starch using periodic acid in accordance with the following equation:

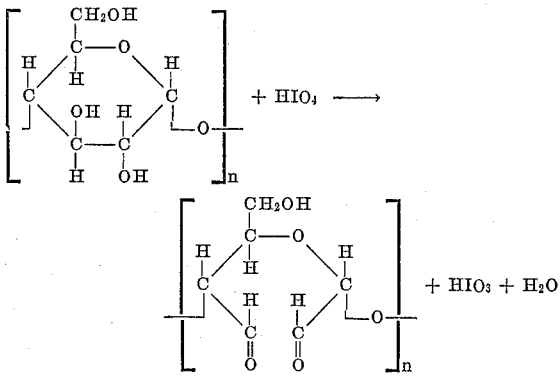

wherein $n$ stands for the number of repeating structural units in the molecule, which may range from as few as about 20 to as many as several thousand. The preparation of dialdehyde starch is more particularly described in U.S. Patents Nos. 2,648,629 of W. Dvonch et al. and 2,713,553 of C. L. Mehltretter. It is also known that these dialdehyde polysaccharides are quite insoluble in water, especially cold or room temperature water. Various techniques have been employed to disperse the dialdehyde polysaccharides and thus increase their water solubility. These materials are generally employed in aqueous applications and thus must be appreciably dissolved or intimately dispersed in aqueous media. It is also known that dialdehyde polysaccharides are useful to improve the wet tensile strength of cellulosic paper. However, a cationizing or coupling agent must be employed to aid in bonding the dialdehyde polysaccharide to the paper or paper pulp. These cationizing agents can be added to the paper or paper pulp prior to contacting the so-treated paper or paper pulp with an aqueous dispersion of dialdehyde polysaccharide. Alternatively, the aqueous dispersion of the dialdehyde polysaccharide can be mixed with the cationizing agent prior to contacting the paper or paper pulp. In either case the difficult step of first dispersing the dialdehyde polysaccharide must be completed before contact with the cationizing agent can be made. Such prior art techniques have the disadvantage of requiring a separate cationizing agent with the attendant supply and mixing problems.

It is the principal object of the present invention to provide a form of dialdehyde polysaccharides which is readily soluble in water at room temperature.

It is another object to provide a form of dialdehyde polysaccharides which requires no separate cationizing agent.

The novel compounds of the present invention comprise the finely-divided solidified reaction products of about 15–30 parts by weight of a condensation product of dicyandiamide and formaldehyde and about 70–85 parts by weight dialdehyde polysaccharides wherein from about 0.5 to about 100 units out of 100 of the original anhydroglucose units of the original polysaccharides have been oxidized to dialdehyde units represented by the formula:

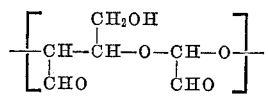

Preferably the compounds of the present invention are formed from dialdehyde polysaccharides which are from about 90 to about 100 percent oxidized. The preferred compounds contain about 70 parts by weight dialdehyde polysaccharides and about 30 parts by weight of a condensation product of dicyandiamide and formaldehyde. In addition, the preferred finely-divided solidified products are spray dried.

The dialdehyde polysaccharides to be used as starting materials to prepare the novel compounds of the present invention may be the dialdehyde derivatives of any polysaccharide, such as corn, wheat, rice, tapioca or potato starches, amyloses, amylopectins, celluloses, gums, dextrans, algins, inulins and the like. Of these polysaccharides, the dialdehyde derivatives of starch known generically as dialdehyde starch are the best known and most widely used. However, where it is desired to have dialdehydes of other polysaccharides, these may be used as well. The dialdehyde polysaccharides useful in the present invention can be from about 0.5 to about 100 percent oxidized; i.e., those wherein about 0.5 to 100 of each 100 of the original anhydroglucose units have been converted to dialdehyde units such as by periodate oxidation as above described. In general, it is preferred to use dialdehyde polysaccharides which are from about 90 percent to 100 percent oxidized.

The condensation products of dicyandiamide and formaldehyde useful as starting materials in preparing the novel compounds of the present invention are well known in the art. Generally such condensation products are prepared by mixing dicyandiamide, formaldehyde and catalyst, such as ammonium chloride, and allowing the exothermic reaction to heat the mixture to about 65°–100° C. The dicyandiamide-formaldehyde condensation product preferably employed in the present invention is prepared by forming an aqueous slurry of 1.5–2.0 moles of formaldehyde and 1 mole of dicyandiamide, adding stepwise to the slurry 0.3 to 0.6 mole of a catalyst, such as ammonium chloride, in amounts to maintain the temperature of the reaction mixture below about 70° C. and to maintain the pH of the reaction mixture initially between about 1.0 and about 2.5 and upon completion of the reaction between about 2.5 and about 3.5, carrying out the reaction at a temperature below about 70° C. and pH below about 3.5 until a water-soluble reaction product having an average molecular weight of about 500 to about 700 is obtained, and then cooling the reaction product to room temperature. Upon standing at room temperature the pH of the reaction mixture will gradually increase within about 2 hours to about 3.8–4.2.

The novel compounds of the present invention are prepared by the novel process of mixing about 70–85 parts by weight dialdehyde polysaccharides with about 15–30 parts by weight condensation product of dicyandiamide and formaldehyde in about 300–500 parts by weight water to form a slurry containing about 20–30 weight percent solids, heating the slurry with stirring to about 70°–100° C., maintaining the slurry at about 70°–100° C. with stirring for about 10–15 minutes until the dispersion of the solid material is complete, cooling the dispersion to about 70° C., adjusting the pH of the dispersion to about 4–5.5 and then drying the dispersion preferably by spray drying and collecting the finely-divided dried solidified product. Preferably the dispersion temperature is about 85°–95° C. Preferably the pH of the dispersion is adjusted to about 4.3–4.5 before spray drying. If the highly acid dispersion obtained by the above process is not adjusted to the above proper pH values before spray drying, the resulting finely-divided solid product is not easily redispersible in water at room temperature. The pH is adjusted by well known techniques, such as adding minor amounts of sodium hydroxide, sodium carbonate, borax, dibasic sodium phosphate and the like. Typical spray drying techniques and apparatus are employed in spray drying the above prepared dispersion.

The product obtained by the above described process is a substantially free-flowing powder which is easily dispersed by simple mixing in water at room temperature. The alkalinity of the water is not critical, but the pH of the final dispersion should be about 4.5–5.0. The resulting dispersion is cationic and readily couples to paper or paper pulp to aid in improving the wet and dry tensile strengths of the so-treated paper as well as of the paper resulting from the so-treated paper pulp. This powder product is a distinct improvement over solidified dialdehyde polysaccharides obtainable in the prior art since the prior materials were not per se dispersible in water at room temperature and were not per se cationic.

The process of the present invention is also a distinct improvement over the prior art since a higher solids content can be employed in the dialdehyde polysaccharide slurry without gel formation. The time at dispersion temperature of about 10–15 minutes is substantially less than the 40 minutes generally used by the prior art to disperse the dialdehyde polysaccharides alone. This feature enables the dispersion process, which was a batch technique in the prior art, to become a substantially continuous process, if desired. The alkalinity of the water employed to prepare the dispersions is not critical in the present invention, whereas the prior art dispersion processes were quite sensitive as to alkalinity of the water.

The invention is further described in the following examples.

*Example 1*

To a 30 liter stainless steel kettle fitted with a steam and water jacket were charged 22.0 liters of tap water and 0.75 kg. of a dicyandiamide-formaldehyde condensation product prepared in accordance with the preferred procedure. The mixture was stirred for about 3 minutes. Dialdehyde corn starch (4.25 kg.), containing 9–10 weight percent moisture and about 90–98 percent oxidized, was then added and the resulting slurry was stirred for about 3 minutes. The reactants were employed in the ratio of 85 weight parts dialdehyde starch to 15 weight parts of the condensation product. Steam was then introduced to the kettle jacket and the stirring was continued. In about 10 minutes the slurry reached the desired temperature of 95° C. The temperature was maintained at this value. A very thick gel formed after 2 minutes at 95° C. and this gel remained for an additional 2 minutes. After about 6–10 minutes, the dispersion was complete. The dispersion was then cooled to about 70° C., the pH adjusted to 4.3–4.5 and then passed into a spray drier having an inlet temperature of about 177° C. and 77° C. outlet temperature. The cationic spray dried product was collected in plastic bags.

The utility of the above product is shown in the following example.

*Example 2*

A 50 g. portion of the product obtained in Example 1 was added to 1000 ml. of distilled water at 26°–28° C. and stirred until the finely-divided material was thoroughly dispersed or dissolved (about 15 min.) A portion of this dispersion of cationic dialdehyde starch was added to a bleached kraft cellulosic pulp having a Canadian Standard Freeness of 525 ml. and which had been diluted to a consistency of 1.0 weight percent based on oven dry pulp. The cationic dialdehyde starch was added in an amount of 1 weight percent based on oven dry pulp. Handsheets of this so-treated pulp were prepared on standard equipment, such as a Noble and Wood handsheet machine. These handsheets were conditioned at 22±1° C. for 24 hours at 50±3 percent relative humidity. Test strips cut from these handsheets were then soaked in distilled water at room temperature for 5 minutes and the wet tensile strength was measured by well known techniques. The procedure followed is described in TAPPI standard T456 M–49. The wet tensile strength was 7.51 lbs./in. of width. Handsheets having the same basis weight (40 lbs. of 500 sheets, 24 x 36 in.) but containing none of the above described cationic dialdehyde starch had wet tensile strength values of only about 1.82 lbs./in. of width. Increasing the dispersing time from 15 minutes to 60 minutes did not have any appreciable effect on the wet tensile strength of paper made from pulp treated with the cationic dialdehyde starch dispersion. Tap water can also be used for forming the dispersion without affecting the wet tensile strength of the resulting paper.

*Example 3*

A reaction product was obtained as described in Example 1 by mixing in a water slurry 80 parts by weight of dialdehyde corn starch described in Example 1 and 20 parts by weight of a condensation product of dicyandiamide and formaldehyde prepared in accordance with the preferred procedure. The spray dried product of this reaction was readily dispersed in distilled water at room temperature and the dispersion employed to treat paper pulp and prepare cellulosic handsheets as described in Example 2. The resulting handsheets had wet tensile strength of about 5.21–5.79 lbs./in. of width. Dispersing times of 15–60 minutes at 26°–27° C. were employed for the cationic dialdehyde starch added to the paper pulp.

*Example 4*

A reaction product was obtained as described in Example 1 by mixing in a water slurry 75 parts by weight of dialdehyde corn starch described in Example 1 and 25 parts by weight of a dicyandiamide-formaldehyde condensation product prepared in accordance with the preferred procedure. The spray dried product of this reaction was dispersed in distilled water at 26°–27° C. with dispersing time of 15–60 minutes, and the dispersion was employed to treat paper pulp and prepare cellulosic handsheets as described in Example 2. The resulting handsheets had wet tensile strength of about 5.88–5.90 lbs./in. of width.

It can be seen from the above examples that the finely-divided solid product of the present invention can be readily dispersed in water at room temperature by simple mixing, and that the resulting cationic dispersion is useful in improving the wet tensile strength of paper.

The finely-divided dry product of the present invention is also quite stable upon storage. It has been stored at room temperature and 48±3 percent relative humidity for 10–20 days and the stored product could still easily disperse in room temperature water. A dispersion of dialdehyde starch in water begins to form a gel and thus becomes unstable after 10–20 days storage.

Use of the product of the present invention for treating paper or paper pulp also results in improved dry strength properties of the treated paper. This is shown in the following example.

*Example 5*

A reaction product was obtained as described in Example 1. The spray dried product was readily dispersed in distilled water at room temperature and the dispersion employed to treat paper pulp and prepare handsheets as described in Example 2. The paper pulp was a northern bleached cellulosic kraft having a Canadian Standard Freeness of 410 cc. Samples of handsheets having same basis weight (40 lbs./ream of 500 sheets, 24 x 36 in.) were also prepared wherein no cationic dialdehyde starch treatment was employed. Properties of the paper prepared both with and without cationic dialdehyde starch were then compared. The results are shown in the following table.

TABLE

| Weight percent cationic dialdehyde starch | Dry [1] tensile strength, lbs./in. width | Dry [2] bursting strength, lbs./sq. in. area | Folding [3] endurance, Schopper double folds |
|---|---|---|---|
| 0 | 13.1 | 75.5 | 610 |
| 1.0 | 19.6 | 100 | 1,550 |

[1] TAPPI Standard T404 os–61.
[2] TAPPI Standard T403 m–53.
[3] TAPPI Standard T423 m–50.

*Example 6*

To a 100 gallon stainless steel kettle fitted with a steam and water jacket and an anchor type agitator were charged 523 lb. of tap water having an alkalinity of 100 ppm. Also added were 78.5 lb. of an aqueous dispersion containing 60 weight percent of a dicyandiamide-formaldehyde condensation product prepared in accordance with the above described preferred procedure. The kettle contents were then agitated for 5 minutes. Moisture-free dialdehyde corn starch (108 lb.) being about 90–98 percent oxidized was then added and the kettle contents agitated for 5 minutes while being heated to 180° F. (82° C.). The reactants were employed in the relative amounts of 70 weight parts of dialdehyde starch and 30 weight parts of the condensation product. The steam was then turned off and agitation was continued for 30 minutes. The dispersion had been completed within 10–15 minutes. The kettle contents were then cooled to 160° F. (71° C.), the pH adjusted to 4.2–4.4 and then passed into a spray drier having an inlet temperature of about 177° C. and an outlet temperature of about 77° C. The resulting cationic spray dried product was collected in fiberboard containers.

The spray dried reaction product prepared above was readily dispersed in distilled water at room temperature (19° C.) to form an aqueous dispersion containing 12 weight percent of the cationic reaction product. A portion of this dispersion of cationic dialdehyde starch reaction product, after standing for 1 hour, was added to an unbleached kraft cellulosic pulp having a Canadian Standard Freeness of 450 ml. and which had been diluted to a consistency of 0.5 weight percent based on oven dry pulp. The pH of the pulp had been adjusted to 4.5 with dilute sulfuric acid. The cationic dialdehyde starch reaction product was added in an amount of 1 weight percent based on oven dry pulp. Handsheets of this so-treated pulp were prepared on standard equipment, such as a Noble and Wood handsheet machine. Test strips cut from these handsheets were then soaked in distilled water at room temperature for 5 minutes and the wet tensile strength was measured in accordance with TAPPI standard T456 M–49. The wet tensile strength was 9.29 lbs./in. of width. Handsheets having the same basis weight (40 lbs. for 500 sheets, 24 x 36 in.) but containing none of the above described cationic reaction product had wet tensile strength values of only about 1.60 lbs./in. of width.

Test strips which were not soaked in water were tested for dry tensile strength according to TAPPI standard T404 OS–61. The handsheets containing the cationic dialdehyde starch reaction product had dry tensile strength of 38.74 lbs./in. of width while prior art handsheets had dry tensile strengths of only about 34.22 lbs./in. of width.

In summary, the present invention relates to a finely-divided solidified cationic reaction product containing about 15–30 parts by weight of a condensation product of dicyandiamide and formaldehyde and about 70–85 parts by weight of a dialdehyde polysaccharide, a process of preparing such solidified reaction product, and cellulosic paper having been treated with a dispersion of such reaction product.

What is claimed is:

1. A composition dispersible in water at room temperature comprising the finely-divided solidified reaction product of about 15–30 parts by weight of a condensation product of dicyandiamide and formaldehyde and about 70–85 parts by weight dialdehyde polysaccharides wherein from about 0.5 to about 100 units out of 100 of the original anhydroglucose units of the original polysaccharides have been oxidized to dialdehyde units represented by the formula:

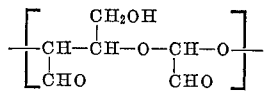

2. A composition dispersible in water at room temperature comprising the finely-divided solidified reaction product of about 30 parts by weight of a condensation product of dicyandiamide and formaldehyde and about 70 parts by weight dialdehyde polysaccharides wherein from about 0.5 to about 100 units out of 100 of the original anhydroglucose units of the original polysaccharides have been oxidized to dialdehyde units represented by the formula:

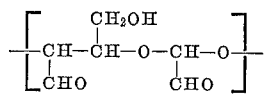

3. A composition dispersible in water at room temperature comprising the finely-divided solidified reaction product of about 15–30 parts by weight of a condensation product of dicyandiamide and formaldehyde and about 70–85 parts by weight dialdehyde polysaccharides wherein from about 90 to about 100 units out of 100 of the original anhydroglucose units of the original polysaccharides have been oxidized to dialdehyde units represented by the formula:

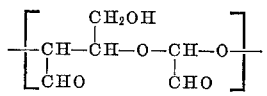

4. A composition dispersible in water at room temperature comprising the finely-divided spray dried reaction product of about 30 parts by weight of a condensation product of dicyandiamide and formaldehyde and about 70 parts by weight dialdehyde polysaccharides wherein from about 90 to about 100 units out of 100 of the original anhydroglucose units of the original polysaccharides have been oxidized to dialdehyde units represented by the formula:

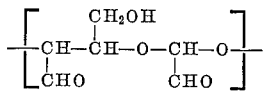

5. A process for preparing a composition dispersible in water at room temperature which comprises mixing in water about 70–85 parts by weight dialdehyde polysaccharides with about 15–30 parts by weight condensation product of dicyandiamide and formaldehyde to form a slurry containing about 20–30 weight percent solids, reacting the non-aqueous constituents of the slurry with each other by heating the slurry with stirring to about 70°–100° C., maintaining the slurry at about 70°–100° C. with stirring for about 10–15 minutes until the dispersion of the solid material is complete, cooling the dispersion to about 70° C., adjusting the pH of the dispersion to about 4–5.5 and then drying the dispersion and collecting the finely-divided dried solidified product.

6. A process as claimed in claim 5 wherein the dispersion temperature is about 85°–95° C.

7. A process as claimed in claim 5 wherein the pH of the dispersion is adjusted to 4.3–4.5 before drying.

8. A process as claimed in claim 5 wherein the dispersion is dried by spray drying.

9. A process as claimed in claim 5 wherein about 70 parts by weight dialdehyde polysaccharides are mixed with about 30 parts by weight of condensation product of dicyandiamide and formaldehyde.

10. A process for preparing a composition dispersible in water at room temperature which comprises mixing in water about 70 parts by weight dialdehyde derivatives of polysaccharides with about 30 parts by weight condensation product of dicyandiamide and formaldehyde to form a slurry containing about 20–30 weight percent solids, reacting the non-aqueous constituents of the slurry with each other by heating the slurry with stirring to about 85°–95° C., maintaining the slurry at about 85°–95° C. with stirring for about 10–15 minutes until the dispersion of the solid material is complete, cooling the dispersion to about 70° C., adjusting the pH of the dispersion to about 4.3–4.5 and then spray drying and collecting the finely-divided dried solidified product.

References Cited by the Examiner
UNITED STATES PATENTS

| | | | |
|---|---|---|---|
| 2,609,367 | 8/1948 | Gaver et al. | 260—209 |
| 2,676,172 | 4/1954 | Roach et al. | 260—209 |
| 2,910,399 | 10/1959 | Jordan | 162—166 |
| 2,986,489 | 5/1961 | Maxwell | 162—166 |
| 3,117,949 | 1/1964 | Borchert | 260—209 |

WILLIAM H. SHORT, *Primary Examiner.*

E. W. WOODBERRY, *Assistant Examiner.*